(12) United States Patent
Sugaya (10) Patent No.: US 9,348,999 B2
(45) Date of Patent: May 24, 2016

(54) USER TERMINAL, RELIABILITY MANAGEMENT SERVER, AND METHOD AND PROGRAM FOR PREVENTING UNAUTHORIZED REMOTE OPERATION

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 158 days.

(21) Appl. No.: 13/743,428

(22) Filed: Jan. 17, 2013

(65) Prior Publication Data

US 2014/0123234 A1    May 1, 2014

(30) Foreign Application Priority Data

Oct. 31, 2012   (JP) .................. 2012-240003

(51) Int. Cl.
| | | |
|---|---|---|
| *G06F 11/00* | (2006.01) | |
| *G06F 12/14* | (2006.01) | |
| *G06F 12/16* | (2006.01) | |
| *G08B 23/00* | (2006.01) | |
| *G06F 21/52* | (2013.01) | |
| *G06F 9/48* | (2006.01) | |
| *G06F 9/54* | (2006.01) | |

(52) U.S. Cl.
CPC .............. *G06F 21/52* (2013.01); *G06F 9/485* (2013.01); *G06F 9/54* (2013.01); *G06F 9/547* (2013.01)

(58) Field of Classification Search
CPC ......... G06F 21/50; G06F 21/52; G06F 21/54; G06F 21/566; G06F 9/485
USPC ................................. 726/4, 22–25
See application file for complete search history.

(56) References Cited

U.S. PATENT DOCUMENTS

| | | | | |
|---|---|---|---|---|
| 7,367,057 | B2 * | 4/2008 | Das et al. .................. | 726/24 |
| 8,195,938 | B2 * | 6/2012 | Fanton et al. .............. | 726/27 |
| 8,438,636 | B2 * | 5/2013 | Isaacs et al. ............... | 726/22 |
| 8,949,979 | B1 * | 2/2015 | Newstadt ............ | H04L 29/06 |
| | | | | 726/22 |
| 2005/0120242 | A1 * | 6/2005 | Mayer et al. ............... | 713/201 |
| 2006/0031943 | A1 * | 2/2006 | Schultz .............. | G06F 21/51 |
| | | | | 726/29 |
| 2007/0271610 | A1 * | 11/2007 | Grobman .................. | 726/22 |
| 2008/0022384 | A1 * | 1/2008 | Yee et al. ................... | 726/11 |
| 2009/0049550 | A1 * | 2/2009 | Shevchenko ............. | 726/23 |
| 2009/0165131 | A1 * | 6/2009 | Treadwell ................. | 726/22 |
| 2012/0110174 | A1 * | 5/2012 | Wootton et al. ........... | 709/224 |

FOREIGN PATENT DOCUMENTS

| | | |
|---|---|---|
| JP | H05-035383 | 2/1993 |
| JP | 2002-041170 | 2/2002 |
| JP | 2007-025497 | 2/2007 |
| JP | 2008-176352 | 7/2008 |
| JP | 2010-092236 | 4/2010 |
| JP | 2010-198386 | 9/2010 |
| JP | 2012-013443 | 1/2012 |
| JP | 2012-185547 | 9/2012 |

* cited by examiner

*Primary Examiner* — Dede Zecher
*Assistant Examiner* — Vadim Savenkov
(74) *Attorney, Agent, or Firm* — Lex IP Meister, PLLC (57) ABSTRACT

It is possible to effectively prevent an unauthorized remote operation of a terminal. A user terminal provides a user with higher precision information related to execution determination of a program to be executed, by detecting, from the program, a command for performing a remote operation with a remote operation terminal, temporarily stopping the execution of the program, and inquiring of a reliability management server about the reliability.

8 Claims, 9 Drawing Sheets

<EXECUTION DETERMINATION TABLE>

| ACQUIRED DATE | ACQUISITION SOURCE IP | COMMUNICATION DESTINATION IP | EXECUTION DETERMINATION |
|---|---|---|---|
| 2011/12/2 11:23:12 | 49.121.61.21 | 49.152.63.XX | X |
| 2011/10/13 2:53:22 | 49.58.123.21 | 49.12.61.YY | O |
| 2011/10/14 14:31:04 | 59.61.23.112 | 49.152.63.XX | X |

USER TERMINAL, RELIABILITY MANAGEMENT SERVER, AND METHOD AND PROGRAM FOR PREVENTING UNAUTHORIZED REMOTE OPERATION

CROSS-REFERENCE TO RELATED APPLICATION

The present application claims priority to Japanese Patent Application No. 2012-240003 filed on Oct. 31, 2012, which is incorporated herein by reference as if reproduced in its entirety.

BACKGROUND OF THE INVENTION

The present invention relates to a user terminal, a reliability management server, and a method and a program for preventing unauthorized remote operation.

In recent years, the number of Internet crimes has increased as the Internet has become more popular. Particularly, even though individuals who have little knowledge of security make efforts to not store important information in the computer, they may sometimes be exposed to criminal acts such as hacking, forewarning of crimes, and the like, which are based on computers, thereby becoming involved in cyber-crimes.

However, using the Internet is of benefit to computer users. Accordingly, it is required to continuously use the Internet while preventing malicious remote operation programs such as Trojan horses.

In view of the above, Japanese Patent Application Publication No. 2012-185547 (JP2012-185547A) discloses a tampering detection device that can detect tampering in a target software program to be monitored without processing the target software program.

In JP 2012-185547A, there is disclosed a method which determines whether or not an address stored in a stack area of a storage unit pertains to any one of a dynamic scope and a static scope in the storage unit when the software program performs a branch or return process, and detects tampering in data stored at a storage area based on the determined result.

However, the method disclosed in JP 2012-185547 can merely block the operation of a program that is maliciously tampered with from an original normal state. Accordingly, the method does not work efficiently in software that is originally designed to perform a malicious operation but appears safe to users.

In the meantime, software for performing an unauthorized remote operation is widely called a "virus," and software for improving security by blocking the penetration and execution of the virus is called "antivirus" software.

The antivirus software is designed to check contents of a program by comparing it with a dictionary-like virus data group, and when finding a part of the contents that is registered as a virus, considers the program to be a virus. For this reason, previously-known viruses can be reliably dealt with. However, since the virus data group is required to be updated every year, for example, and a time lag to deal with a new virus occurs, a complete virus list may not be produced by an individual or the antivirus software is expensive due to its high performance.

Accordingly, the present inventors have devised a method that is capable of, without introducing antivirus software, determining whether or not to execute a program, with high precision, by detecting, from the program, a command for performing a remote operation to capture only processes for performing remote operations and calculating reliability by using data accumulated from the past, instead of inquiring into and checking each piece of software.

SUMMARY

In view of the above, the present invention provides a user terminal that is capable of providing a user with higher precision information related to determination on whether or not to execute a program by detecting, from the program, a command for performing a remote operation, temporarily stopping the execution of the program, and inquiring about reliability of the program from a reliability management server.

The following means are suggested in the present invention.

In accordance with a first aspect of the present invention, there is provided a user terminal communicably connected to a device through a network, including: a call detecting means configured to detect, from a program, a call of a command for performing a remote operation with the device when the user terminal executes the program; an execution stop means configured to temporarily stop execution of the program corresponding to the call of the command detected by the call detecting means immediately before the command is called; an execution determination receiving means configured to receive, from a user, determination on whether or not the command of the program is called; and an execution restarting means configured to restart the execution of the program stopped by the execution stop means when the execution determination receiving means receives input of permission.

According to the first aspect of the present invention, the user terminal communicably connected to the device through the network detects, from a program, a call of a command for performing a remote operation with the device when the user terminal executes the program; temporarily stops execution of the program corresponding to the detected call of the command immediately before the command is called; receives, from a user, a determination on whether or not the command of the program is called; and restarts the execution of the program stopped by the execution stop means when input of permission is received.

Although the first aspect of the present invention is in a category of a user terminal, the same actions and effects are obtained in the unauthorized remote operation method and program.

In accordance with a second aspect of the present invention, in the user terminal of the first aspect, there is provided a user terminal further including: an execution determination storing means configured to store the input received by the execution determination receiving means in a storage unit included in the user terminal; and a history display means configured to display, on a screen, program information of the program corresponding to the call of the command detected by the call detecting means and information related to execution determinations of the program previously inputted by users and stored by the execution determination storing means.

According to the second aspect of the present invention, the user terminal of the first aspect stores the received input in the storage unit included in the user terminal; and displays, on the screen, the program information of the program corresponding to the detected call of the command and information related to execution determinations of the program previously inputted by users.

In accordance with a third aspect of the present invention, in the user terminal of the first or second aspect, there is provided a user terminal further including: an execution determination reporting means configured to store the input received by the execution determination receiving means in a reliability management server that is communicably connected to the user terminal; and a reliability display means configured to display, on a screen, program information of the program corresponding to the call of the command detected by the call detecting means and at least one of information related to execution determinations of the program previously inputted by at least one user and received from the reliability management server.

According to the third aspect of the present invention, the user terminal of the first or second aspect stores the received input in the reliability management server that is communicably connected to the user terminal; and displays, on the screen, the program information of the program corresponding to the detected call of the command and at least one of information related to execution determinations of the program previously inputted by at least one user and received from the reliability management server.

In accordance with a fourth aspect of the present invention, there is provided a reliability management server which is communicably connected to the user terminal of the third aspect, including: an execution determination storing means configured to receive, from the user terminal, the input received by the execution determination receiving means and store the received input in a storage unit; a reliability calculating means configured to apply a statistical process to information related to execution determinations stored by the execution determination storing means to calculate reliability of the program related to the execution determinations; and a reliability providing means configured to transmit, to the user terminal, at least one of an execution determination stored by the execution determination storing means and the reliability calculated by the execution determination accumulating means in response to the request of the user terminal.

According to the fourth aspect of the present invention, the reliability management server which is communicably connected to the user terminal of the third aspect receives, from the user terminal, input received by the execution determination receiving means and stores the received input in the storage unit; applies the statistical process to the stored information related to execution determinations; calculates the reliability of the program related to the execution determinations; and transmits, to the user terminal, at least one of the stored execution determination and the calculated reliability, in response to the request of the user terminal.

In accordance with a fifth aspect of the present invention, there is provided a method for preventing an unauthorized remote operation, which is performed by a user terminal communicably connected to a device through a network, including: detecting, from a program, a call of a command for performing a remote operation with the device when the user terminal executes the program; temporarily stopping execution of the program corresponding to the detected call of the command immediately before the command is called; receiving, from a user, input related to whether or not the command of the program is called; and restarting the execution of the program stopped in the stopping step, when input of permission is received from the user.

In accordance with a sixth aspect of the present invention, there is provided a program for preventing an unauthorized remote operation, which is performed by a user terminal communicably connected to a device through a network, including: detecting, from a program, a call of a command for performing a remote operation with the device when the user terminal executes the program; temporarily stopping execution of the program corresponding to the detected call of the command immediately before the command is called; receiving, from a user, input related to whether or not the command of the program is called; and restarting the execution of the program stopped in the stopping step, when input of permission is received from the user.

In accordance with the aspects of the present invention, it is possible to provide a user terminal that is capable of providing a user with higher precision information related to execution determination of a program by detecting, from the program, a command for performing a remote operation; temporarily stopping the execution of the program; and inquiring of a reliability management server about the reliability.

DETAILED DESCRIPTION

Hereinafter, an embodiment of the present invention will be described with reference to the accompanying drawings. This embodiment is merely an example, and the technical scope of the present invention is not limited thereto.

[Outline of Unauthorized Remote Operation Preventing System 1]

Figure 1:
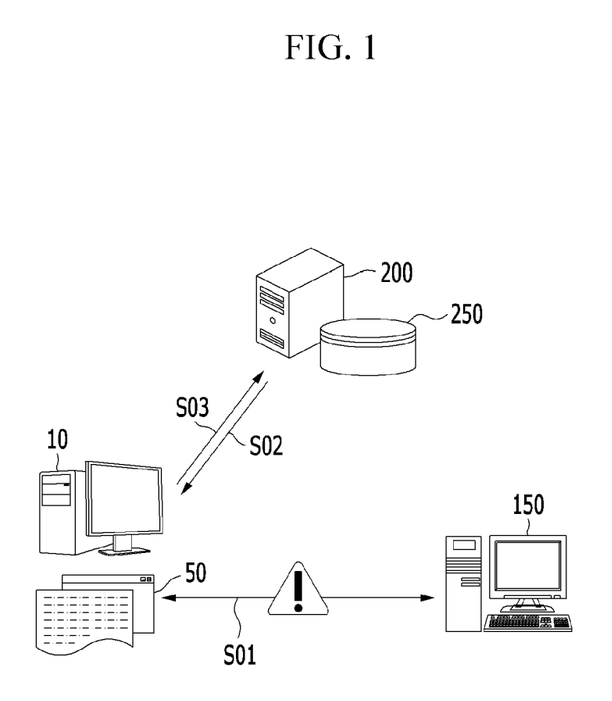
FIG. 1 schematically shows an unauthorized remote operation preventing system 1.

FIG. 1 schematically shows an unauthorized remote operation preventing system 1 including a user terminal 10, a remote operation terminal 150, and a reliability management server 200 in an exemplary embodiment of the present invention. Based on FIG. 1, the outline of the unauthorized remote operation preventing system 1 will be described as follows.

In the unauthorized remote operation preventing system 1, the user terminal 10 is communicably connected to the reliability management server 200. Also, in the unauthorized remote operation preventing system 1, the user terminal 10 is communicably connected to the remote operation terminal 150.

First, the user terminal 10 executes a program 50. To execute the program 50, the user terminal 10 reads computer software or a programming language. Here, the program 50 may be created by using a so-called virtual machine or script engine, which records detailed contents to be processed in an external file such as a setting file, an intermediate code, and a script file, and controls the operation by reading recorded contents, regardless of whether it is a compiled file or a script language.

The user terminal 10 detects a command for allowing the remote operation terminal 150 to perform a remote operation with respect to the user terminal 10 itself or perform a remote operation with respect to the remote operation terminal 150 (step S01) as a step that is executed after analyzing the program 50 that is being executed, for every step to be executed. Hereinafter, the command for performing a remote operation is collectively referred to as "remote operation command." Such detection of the remote operation command may be performed by using a combination of namespace and function name, a combination of successive commands, a file name of the read-out DLL (dynamic link library), or the like.

In other words, if the program 50 is operable on ".net framework," the step for performing a remote operation may be detected by using the combination of namespace and function name while the step is executed. Further, if the program 50 is operable on a Java virtual machine, the step for performing a remote operation may be detected by using packet name and class name.

In addition, if the program 50 is created by using a complete machine language, the step for performing a remote operation may be detected by analyzing commands related to the CPUs of each user terminal 10 and checking whether or not patterns of the commands which are successively executed in a certain range are similar to pre-stored patterns of commands which are executed when the remote operation is performed. Further, such detection may be performed at a precision level that can be adjusted according to user's explanation.

As described above, the detection is performed while the program 50 is executed, but the detection timing is not limited thereto. With predetermined timing, the calling of functions and/or commands for performing remote operations may be detected from a whole part of the program 50.

When the user terminal 10 detects, from the program 50, a step for performing a remote operation, the user terminal temporarily stops the execution of the program 50 before performing the remote operation. Then, the user terminal 10 sends a query to the reliability management server 200 about the reliability of the program 50.

Specifically, first, the user terminal 10 transmits information of the program 50 to the reliability management server 200. The reliability management server 200 extracts information related to the program 50 from an execution determination database 250 which stores history related to whether or not the program 50 was previously executed by users. Then, the reliability management server 200 calculates reliability based on the extracted information and transmits it to the user terminal 10 (step S02). Here, the history related to whether or not the program 50 was previously executed by users includes history related to whether or not the program 50 was previously executed by users who inquire about the reliability and history related to whether or not the program 50 was previously executed by unspecified users.

The user terminal 10 displays the reliability transmitted from the reliability management server 200 and receives, from a user, input of determination on whether or not to execute the program 50. When, for example, use of the reliability management server 200 becomes difficult, the execution determination stored in the user terminal 10 may be merely read out and displayed on a display unit.

When receiving the input of determination on whether or not to execute the program 50 from a user, the user terminal 10 transmits the input to the reliability management server 200 (step S03). The reliability management server 200 stores the input in the execution determination database 250 in such a way so as to use it when the reliability is calculated the next time.

Finally, the user terminal 10 deals with the program 50 based on the received input. Specifically, when receiving the input of permitted execution determination of the program 50, the user terminal 10 restarts executing the program 50 from the step for performing the remote operation. Contrarily, when receiving the input of rejected execution determination of the program 50, the user terminal 10 closes the program 50 or only the function that has been executed. In the case that the program 50 is editing certain data, if the execution of the program 50 is not permitted, it is preferable to allow a user to determine how to deal with the program 50 since the stopping of the whole part of the program 50 may cause serious damage to the user.

The outline of the unauthorized remote operation preventing system 1 has been described so far.

[System Structure of the Unauthorized Remote Operation Preventing System 1]

Figure 2:
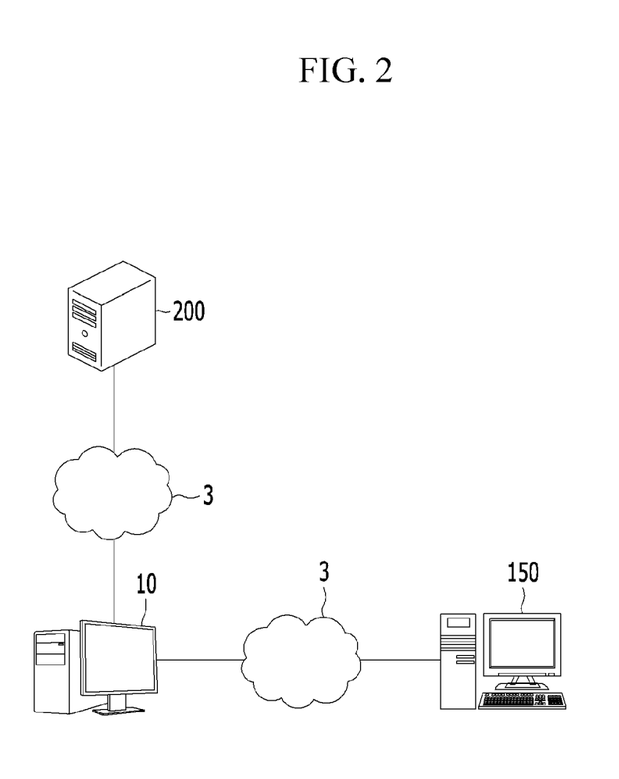
FIG. 2 shows an overall structure of the unauthorized remote operation preventing system 1.

FIG. 2 shows a system structure of the unauthorized remote operation preventing system 1 in accordance with the exemplary embodiment of the present invention. The unauthorized remote operation preventing system 1 includes the user terminal 10, the remote operation terminal 150, the reliability management server 200, and a public line network 3 (e.g., Internet network, third or fourth generation communications network, or the like).

The reliability management server has the following function to accumulate users' determinations on whether or not to execute the program 50 in order to manage the reliability per program.

The user terminal 10 is an electronic device for home or business use, which can performs data communications, and includes, e.g., an electronic information appliance such as a portable phone, a portable information terminal, a network terminal, a slate terminal, an electronic dictionary terminal, a portable music player, an audio component, a content recording and playback player, a printer, a fax machine, a copy machine, a scanner, and an MFP (multi-functional peripheral device or multi-functional printer), a major appliance (or white good) such as a refrigerator, a washing machine, a dishwasher, an electric fan, an air conditioner, an electric stove, a cooker and a microwave, electric lighting, a server, a router, a gateway, a NAS (network attached storage), and the like, in addition to a personal computer, a television, a telephone, and a computer.

The remote operation terminal 150 is a general information terminal which can perform a remote operation with respect to the user terminal 10 and allow the user terminal 10 to perform a remote operation with respect to the remote operation terminal 150 itself.

In the present invention, a communicable connection through the public line network 3 is made between the user terminal 10 and the reliability management server 200 and between the user terminal 10 and the remote operation terminal 150. At this time, direct communication does not need to be performed between the reliability management server 200 and the remote operation terminal 150. Further, the communications can be performed through a wire or in a wireless way in the unauthorized remote operation preventing system 1.

In addition, only one remote operation terminal 150 is shown in FIG. 2, but a plurality of remote operation terminals 150 may be provided. The remote operation terminal 150 may be connected to the user terminal 10 by using a wire or a near-field communication network. This is also same in the reliability management server 200.

[Functions]

Figure 3:
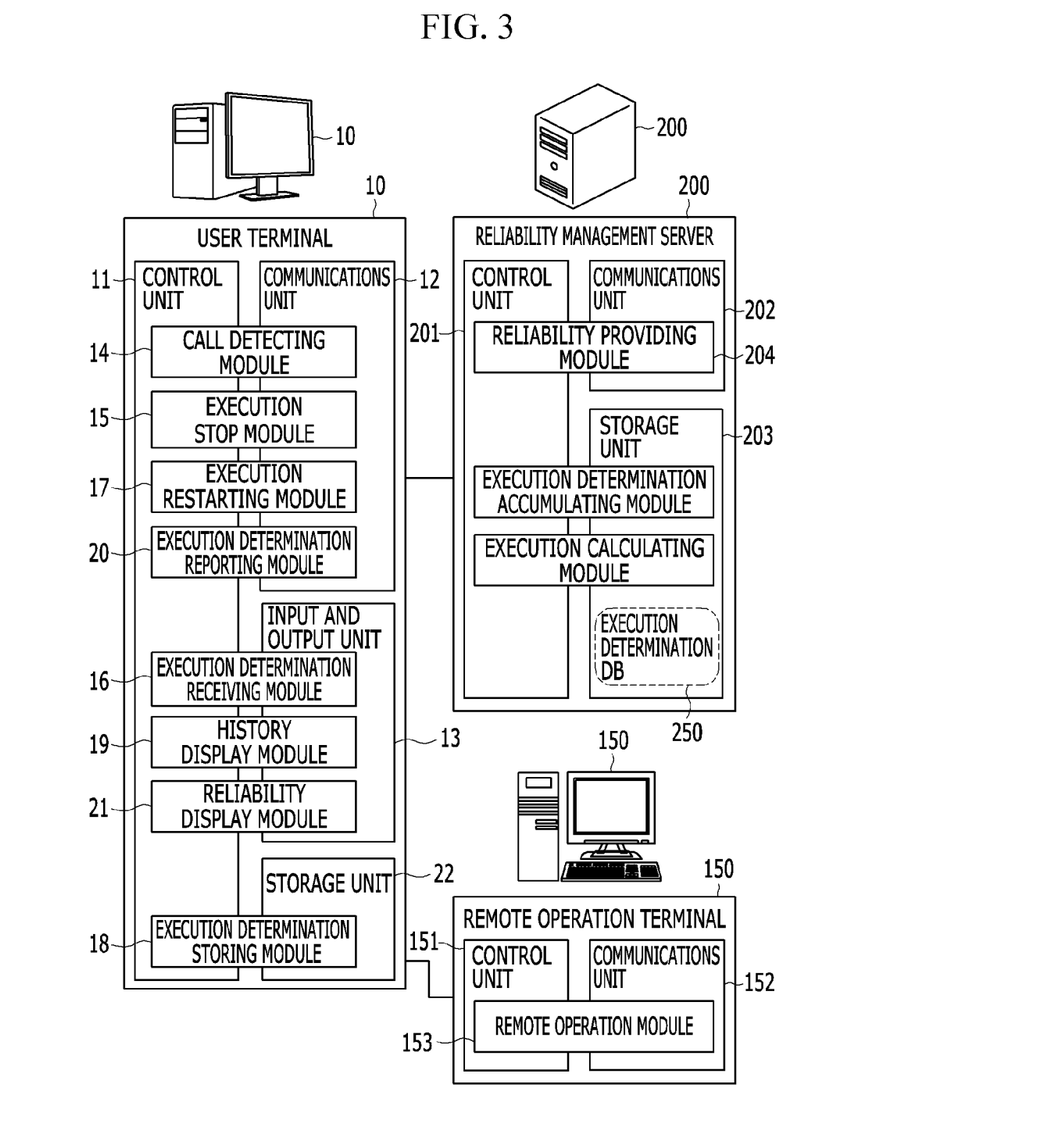
FIG. 3 is a functional block diagram showing a user terminal 10, a remote operation terminal 150, and a reliability management server 200.

FIG. 3 is a functional diagram showing the user terminal 10, the remote operation terminal 150, and the reliability management server 200, and relationships therebetween.

The user terminal 10 includes a control unit 11 formed of a CPU (central processing unit), a RAM (random access memory), a ROM (read only memory), and the like; a communications unit 12, e.g., a WIFI (wireless fidelity) device conforming to IEEE802.11 or a wireless device conforming to the IMT-2000 standard, such as a third generation mobile communication system; and the like (a LAN connection using a wire is possible).

The user terminal 10 further includes an input and output unit 13 formed of, e.g., a display unit for outputting and displaying data and/or images controlled by the control unit 11; a touch panel, a keyboard, and a mouse for receiving input from a user or an operator; and the like, and a storage unit 22 such as a data storage formed of a hard disk or a semiconductor memory.

In the user terminal 10, as the control unit 11 reads out a predetermined program and cooperates with the communications unit 12, a call detecting module 14, an execution stop module 15, an execution restarting module 17, and an execution determination reporting module 20 are realized. Further, in the user terminal 10, as the control unit 11 reads out a predetermined program and cooperates with the input and output unit 13, an execution determination receiving module 16, a history display module 19, and a reliability display module 21 are realized. Furthermore, in the user terminal 10, as the control unit 11 reads out a predetermined program and cooperates with the storage unit 22, an execution determination storing module 18 is realized.

Similarly, the reliability management server 200 includes a control unit 201 formed of a CPU, a RAM, a ROM, and the like; a communications unit 202, e.g., a WIFI device conforming to IEEE802.11 or a wireless device conforming to the IMT-2000 standard, such as a third generation mobile communication system; and the like (a LAN connection using a wire is possible). The reliability management server 200 further includes a storage unit 203 such as a data storage unit formed of a hard disk or a semiconductor memory. The reliability management server 200 has the execution determination database 250 in the storage unit 203.

In the reliability management server 200, as the control unit 201 reads out a predetermined program and cooperates with the communications unit 202, a reliability providing module 204 is realized. Further, in the reliability management server 200, as the control unit 201 reads out a predetermined program and cooperates with the storage unit 203, a reliability determination accumulating module 205 and a reliability calculating module 206 are realized.

Similarly, the remote operation terminal 150 includes a control unit 151 formed of a CPU, a RAM, a ROM, and the like; a communications unit 152, e.g., a WIFI device conforming to IEEE802.11 or a wireless device conforming to the IMT-2000 standard, such as a third generation mobile communication system; and the like (a LAN connection using a wire is possible).

In the remote operation terminal 150, as the control unit 151 reads out a predetermined program and cooperates with the communications unit 152, a remote operation module 153 is realized.

[Unauthorized Remote Operation Preventing Process]

Figure 4:
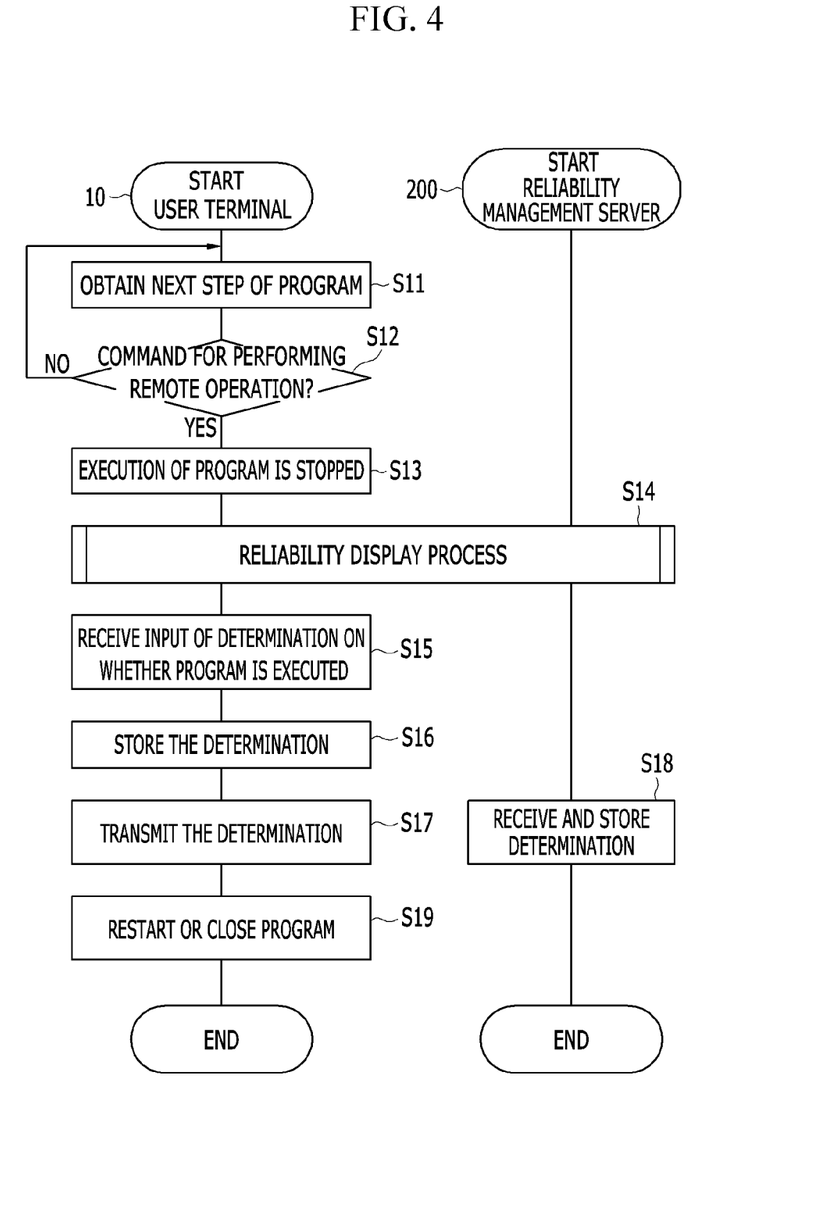
FIG. 4 is a flowchart showing how an unauthorized remote operation preventing process is performed by the user terminal 10 and the reliability management server 200.

FIG. 4 is a flowchart showing how an unauthorized remote operation preventing process is performed by the user terminal 10 and the reliability management server 200. Steps to be executed by the aforementioned modules of each unit will be described together in the present process.

First, the user terminal 10 obtains processing contents of a next step while executing a program step by step (step S11). Here, a "step" which indicates an execution unit constructing a program to be executed may be a regular minimum unit command such as a CPU command or processing stage for a function or the like. As the step unit is smaller, the precision level of the detection of steps for performing remote operations to be described later is increased, and the execution load also becomes larger.

The call detecting module 14 of the user terminal 10 detects a command for performing a remote operation by determining whether or not the obtained processing contents pertain to a command for performing a remote operation with another device through a network, for example, a command for calling the function of the remote operation module 153 of the remote operation module terminal 150 (step S12). When the processing contents do not pertain to a command for performing a remote operation ("No" in step S12), the process returns to step S11 and repeats it until detecting a command for performing a remote operation. Contrarily, when the processing contents pertain to a command for performing a remote operation ("Yes" in step S12), the process proceeds to a following step without returning to step S11.

Here, such detection may be performed by using a combination of namespace and function name, a combination of successive commands, a file name of the read-out DDL, or the like. Further, the call detecting module 14 may analyze data of a packet transmitted or received by the communications unit 12 instead of a program itself and checks the analyzed data by comparing it with a previous protocol, and may thus detect the execution of remote operation to thereby detect, from the program, a command for performing a remote operation.

Furthermore, the call detecting module 14 may perform the detection even when the user terminal 10 performs no direct communication with the remote operation terminal 150 and a terminal for relaying the remote operation with the user terminal 10 in a same near-field communication network exists.

When the call detecting module 14 detects a command, the execution stop module 15 of the user terminal 10 temporarily stops the execution of a program corresponding to the detected command (step S13). Instead of stopping the execution of the program itself, the execution stop module 15 may stop the command for the performing operation by blocking the realization of the function of the communications unit 12 from the program. Further, when a user determines whether or not to execute the program, the following reliability display process is performed to provide the user with information related to reliability of the program (step S14).

[Reliability Display Process]

Figure 5:
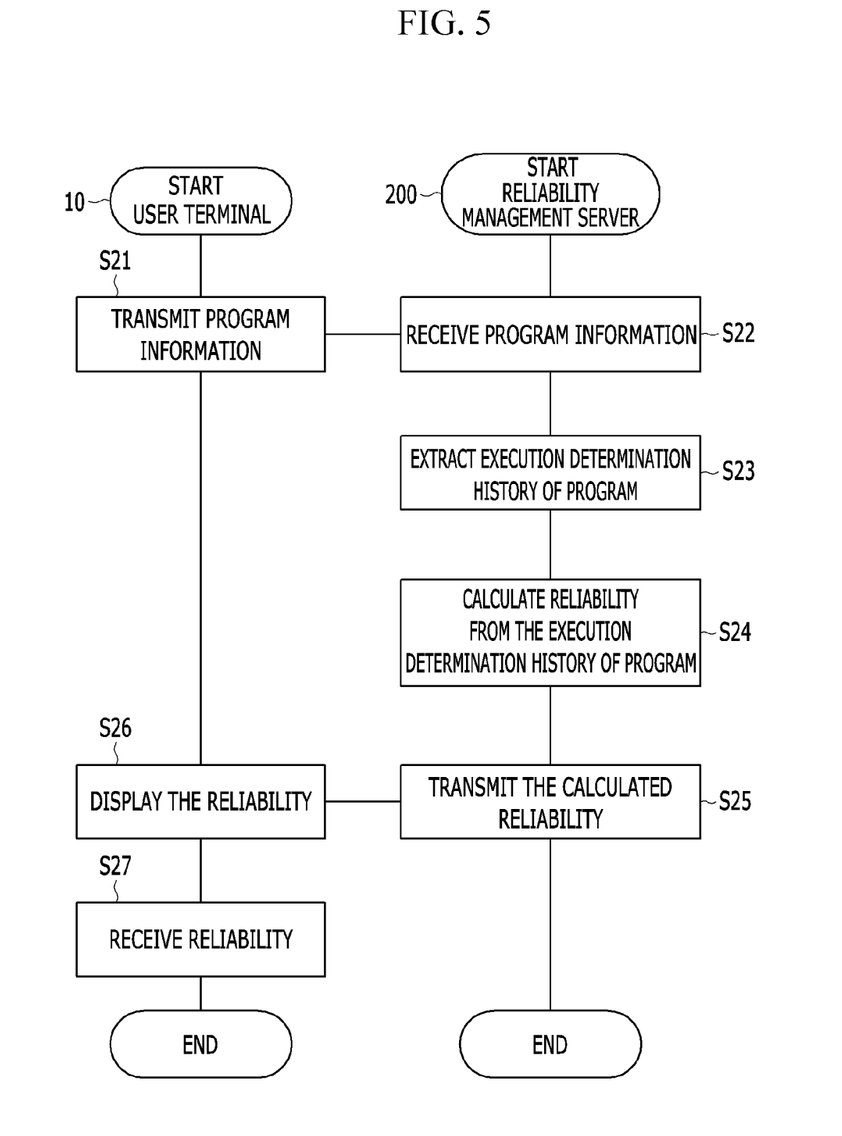
FIG. 5 is a flowchart showing how a reliability display process is performed by the user terminal 10 and the reliability management server 200.

FIG. 5 is a flowchart showing how a reliability display process is performed by the user terminal 10 and the reliability management server 200. Steps to be executed by the aforementioned modules of each unit will be described together in the present process.

First, the execution determination reporting module 20 of the user terminal 10 transmits, to the reliability management server 200, information of the program corresponding to the detected command (step S21). Here, such program information is not limited to general information such as a program author, a created date, a program title, and data size, and program information related to program attributes and behaviors may be transmitted, the program information containing, e.g., a communication destination of remote operation, a frequency of calling a remote operation, an acquisition method of download source, or the like. Further, when the restriction of wires and capacities is small, all data of the program as program information may be transmitted.

Next, the reliability management server 200 receives the program information (step S22), and extracts execution determination data of the program or a similar program from the execution determination database 250 by transferring it to the reliability calculating module 206 (step S23).

Figure 9:
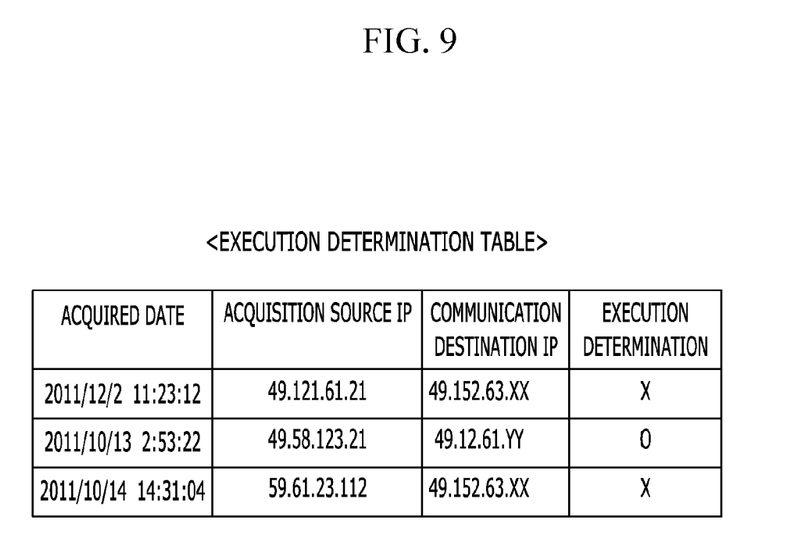
FIG. 9 partially shows an execution determination table included in an execution determination database 250.

FIG. 9 partially shows an execution determination table included in the execution determination database 250. The execution determination table stores acquisition source IPs representing users who determine whether or not to execute the program and the aforementioned program information. As for the program information shown in FIG. 9, only IPs of communication destinations of remote operations are shown, and the illustration of other information is omitted.

The reliability calculating module 206 calculates, from the execution determination table, similarity between the received program information and program information of the execution determination table to extract data related to a certain program or a similar program. The similarity may be calculated by using the number of items to be matched with each other in the received program information and the program information of the execution determination table. Particularly, the communication destination IPs need to be considered as important factors since the reliability of the program is greatly affected by the communication destination IPs. Further, more recently stored data related to the execution determination need to be considered to be more important than earlier stored data. In addition, a user who has provided data related to the execution determination may be different from a user who currently requests reliability. In this way, it is possible to use more data.

Next, the reliability calculating module 206 calculates reliability of the program by applying a statistical process to the extracted execution determination data (step S24). As a most basic statistical process, it is possible to calculate what percentage of all users permit or reject the execution of the program. In addition, another process may be performed in order to foster an increase in the reliability precision or human users to more easily analyze the meaning, by applying a statistical process.

Specifically, statistical verification is performed on the hypothesis that a newly found program is safe when a conclusion that, if a program is safe, 90% of all users permit the execution of the program is recognized from the past data, for example. If the hypothesis is rejected, the sentences that "the execution of this program is very dangerous" and "please permit the execution only when the source of requesting the execution of the program is reliable" are displayed as the reliability, so that the possibility that users can make a correct determination is increased more than the case that the sentence "55% of all users reject the execution of this program" is displayed.

Next, the reliability providing module 204 transmits the calculated reliability to the user terminal 10 (Step S25). The user terminal 10 receives the reliability (step S26), and the reliability display module 21 displays the received reliability on a display unit (step S27). The processing sequences of the reliability display process have been described so far.

Returning to the unauthorized remote operation preventing process, the execution determination receiving module 16 of the user terminal 10 receives input of a determination on whether or not to execute the stopped program from a user (step S15). Further, when using the reliability management server 200 becomes difficult or when the user terminal 10 does not have the function for communicating with the reliability management server 200, the user terminal 10 may display, as a reliability on a display unit, execution determination records previously stored in the storage unit 22 by the execution determination storing module 18, which will be described later, instead of the reliability display process. If using the execution determination records also becomes difficult, the input of a determination on whether or not to execute the stopped program may be received without displaying the reliability.

Figure 6:
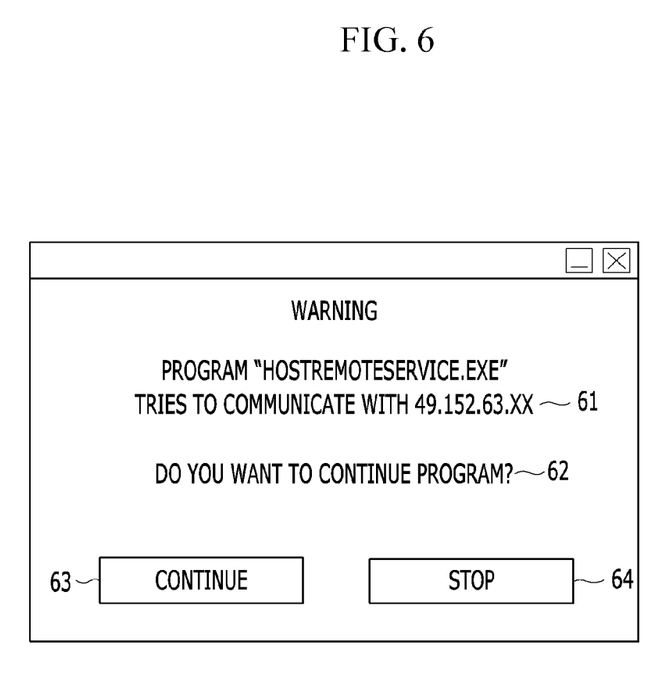
FIG. 6 shows an example of a screen for receiving input of determination on whether or not to execute a program when no reliability is displayed.

FIG. 6 shows an example of a screen for inputting a determination on whether or not to execute a program when no reliability is displayed. In addition to a report message 61 containing a program title and a communication destination, a message 62 urging a user to input a determination on whether or not to execute the program, a "continue" button 63 indicating the execution permission, and a "stop" button 64 indicating execution rejection are displayed on the screen.

Figure 7:
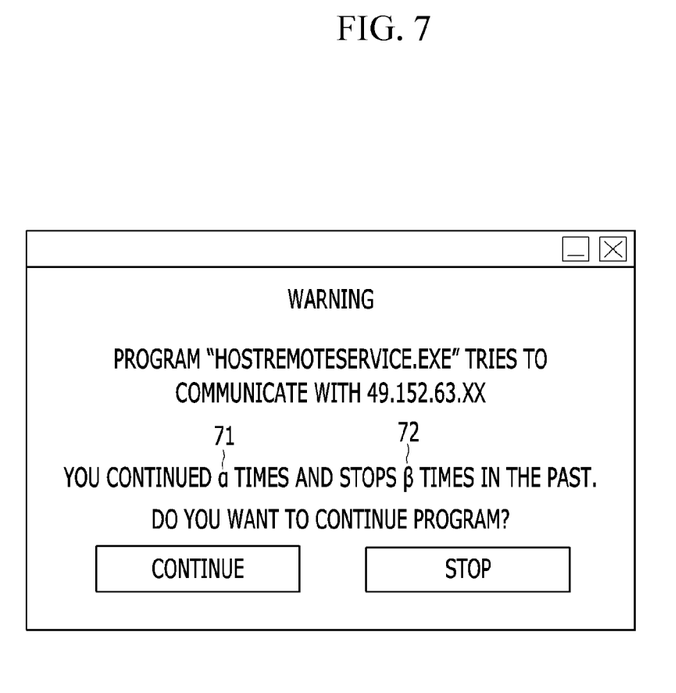
FIG. 7 shows an example of a screen for receiving input of determination on whether or not to execute a program when history related to whether or not the program was previously executed is displayed as a reliability.

FIG. 7 shows an example of a screen for inputting a determination on whether or not to execute a program when history related to whether or not the program was previously executed is displayed as the reliability. A permission frequency 71 at which the user previously permitted the execution of the program and a rejection frequency 72 at which the user previously rejected the execution of the program are displayed on the screen.

Figure 8:
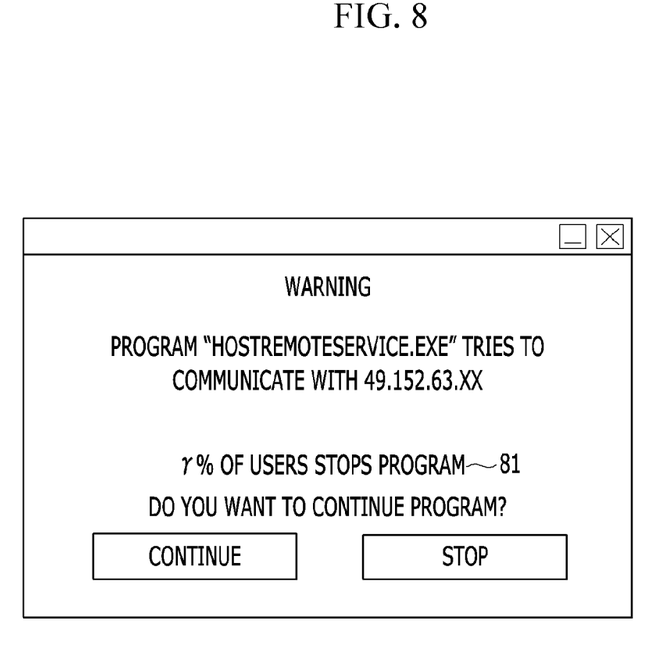
FIG. 8 shows an example of a screen for receiving input of determination on whether or not to execute a program when a reliability calculated by the reliability management server 200 is displayed.

FIG. 8 shows an example of a screen for inputting a determination on whether or not to execute a program when reliability calculated by the reliability management server 200 is displayed. A message 81 related to the reliability calculated by the reliability management server 200 is displayed. In addition, the message 81 may contain sentences representing the reliability, for example, "the execution of the program is very dangerous" and "please permit the execution only when the source of requesting the execution of the program is reliable." Otherwise, the same buttons as those of FIG. 6 are displayed on the screen.

Next, the execution determination reporting module 20 transmits the determination result to the reliability management server 200 (step S17), and the execution determination accumulating module 205 stores the determination result and the program information in the execution determination database 250 (step S18).

Finally, the program is dealt with depending on the execution determination inputted by the user (step S19). When the user permits the execution of the program, the execution restarting module 17 restarts execution of the program from the stopped step to perform the remote operation with the remote operation terminal 150. Contrarily, when the user rejects the execution of the program, the program is not restarted. Thereafter, the program may be forcibly closed by a user or the execution stop module 15.

Further, in the present invention, the program is restarted after the execution determination is reported to the reliability management server 200. Accordingly, it is sometimes the case that the execution determination to be reported needs to be modified when, for example, an unauthorized remote operation is performed although the execution permission has been selected. In this case, by continuously displaying the same screen as that of FIG. 6 until the execution of the program is finished, the execution of the program may be forcibly finished at the time when the stop button is selected, and the execution determination is modified later. In the meantime, the reliability management server 200 may consider such execution stop report of the modified execution determination to be more important than the execution determination reported before the restarting of execution.

The processing sequences of the unauthorized remote operation preventing process have been described so far.

The aforementioned means and functions are realized by reading out and executing a predetermined program by a computer (including a CPU, an information processing apparatus, and various terminals). The program is recorded in a computer-readable recording medium, e.g., a flexible disk, a CD (e.g., a CD-ROM or the like) and a DVD (e.g., a DVD-ROM, a DVD-RAM, or the like). In this case, the program is read out from the recording medium by a computer and transmitted to an internal storage unit or an external storage unit to be stored and executed. Further, the program may be pre-stored in a storage unit (recording medium) such as a magnetic disk, an optical disk, or an optical magnetic disk and transmitted from the recording medium to a computer through a communications line.

Hitherto, although the embodiment of the present invention has been described, the present invention is not limited thereto. Further, the effects described in the embodiment of the present invention are merely most exemplary effects obtained from the present invention, but the effects of the present invention are not limited to those specified in the embodiment of the present invention.

What is claimed is:

1. A user terminal communicably connected to a device through a network, the user terminal comprising:
    a control unit configured to obtain, while executing a program step by step, a processing content at a next step, and to execute one or more modules comprising:
        a call detecting module configured to detect a call of a command for performing a remote operation by determining whether the obtained processing content at the next step includes the command for performing the remote operation;
        an execution stop module configured to temporarily stop execution of the program corresponding to the call of the command detected by said call detecting module immediately before the command is called;
        a history display module configured to display, on a screen, program information of the program corresponding to the call of the command detected by said call detecting module and information related to execution determinations of the program previously inputted by users to allow a user to determine on whether or not the command of the program is called, the information related to execution determinations of the program previously inputted by users being received from a reliability management server when the user terminal is able to communicate with the reliability management server, and to display, on the screen, program information of the program corresponding to the call of the command detected by said call detecting module and information related to execution determinations of the program previously stored by the user of the user terminal to allow the user to determine on whether or not the command of the program is called when the user terminal is not able to communicate with the reliability management server;
        an execution determination receiving module configured to receive, from the user, determination on whether or not the command of the program is called; and
        an execution restarting module configured to restart the execution of the program stopped by the execution stop module from a step at which the program is temporarily stopped when said execution determination receiving module receives input of permission.

2. The user terminal of claim 1, wherein the one or more modules further comprises:
    an execution determination storing module configured to store the input received by said execution determination receiving module in a storage unit included in the user terminal.

3. The user terminal of claim 1, wherein the one or more modules further comprises:
    an execution determination reporting module configured to store the input received by said execution determination receiving module in the reliability management server that is communicably connected to the user terminal; and
    a reliability display module configured to display, on a screen, program information of the program corresponding to the call of the command detected by said call detecting module and at least one of information related to execution determinations of the program previously inputted by at least one user and received from the reliability management server.

4. A reliability management server which is communicably connected to the user terminal described in claim 3, the server comprising:
    a control unit configured to execute one or more modules comprising:
    an execution determination storing module configured to receive, from the user terminal, the input received by the execution determination receiving module and store the received input in a storage unit;
    a reliability calculating module configured to apply a statistical process to information related to execution determinations stored by said execution determination storing module to calculate reliability of the program related to the execution determinations; and
    a reliability providing module configured to transmit, to the user terminal, at least one of an execution determination stored by said execution determination storing module and the reliability calculated by said reliability calculating module, in response to a request of the user terminal.

5. The user terminal of claim 2, wherein the one or more modules further comprises:
    an execution determination reporting module configured to store the input received by said execution determination receiving module in the reliability management server that is communicably connected to the user terminal; and
    a reliability display module configured to display, on a screen, program information of the program corresponding to the call of the command detected by said call detecting module and at least one of information related to execution determinations of the program previously inputted by at least one user and received from the reliability management server.

6. A reliability management server which is communicably connected to the user terminal described in claim 5, the server comprising:
    a control unit configured to execute one or more modules comprising:
    an execution determination accumulating module configured to receive, from the user terminal, the input received by said execution determination receiving module and store the received input in a storage unit;
    a reliability calculating module configured to apply a statistical process to information related to execution determinations stored by said execution determination accumulating module to calculate reliability of the program related to the execution determinations; and a reliability providing module configured to transmit, to the user terminal, at least one of an execution determination stored by said execution determination storing module and the reliability calculated by said reliability calculating module in response to a request of the user terminal.

7. A method for preventing an unauthorized remote operation, which is performed by a user terminal communicably connected to a device through a network, the method comprising:

obtaining, while executing a program step by step, a processing content at a next step;

detecting, from a program, a call of a command for performing a remote operation with the device by determining whether the obtained processing content at the next step includes the command for performing the remote operation;

temporarily stopping an execution of the program corresponding to the detected call of the command immediately before the command is called;

displaying, on a screen, program information of the program corresponding to the detected call of the command and information related to execution determinations of the program previously inputted by users to allow a user to determine on whether or not the command of the program is called, the information related to execution determinations of the program previously inputted by users being received from a reliability management server when the user terminal is able to communicate with the reliability management server, and displaying, on the screen, program information of the program corresponding to the call of the command detected by said call detecting module and information related to execution determinations of the program previously stored by the user of the user terminal to allow the user to determine on whether or not the command of the program is called when the user terminal is not able to communicate with the reliability management server;

receiving, from the user, input related to whether or not the command of the program is called; and  restarting the execution of the program from a step at which the program is temporarily stopped, when input of permission is received from the user.

8. A non-transitory computer-readable recording medium that store a program for preventing an unauthorized remote operation, which is executed by a user terminal communicably connected to a device through a network, the program comprising:

obtaining, while executing a program step by step, a processing content at a next step;

detecting, from a program, a call of a command for performing a remote operation with the device by determining whether the obtained processing content at the next step includes the command for performing the remote operation;

temporarily stopping execution of the program corresponding to the detected call of the command immediately before the command is called;

displaying, on a screen, program information of the program corresponding to the detected call of the command and information related to execution determinations of the program previously inputted by users to allow a user to determine on whether or not the command of the program is called, the information related to execution determinations of the program previously inputted by users being received from a reliability management server when the user terminal is able to communicate with the reliability management server, and displaying, on the screen, program information of the program corresponding to the call of the command detected by said call detecting module and information related to execution determinations of the program previously stored by the user of the user terminal to allow the user to determine on whether or not the command of the program is called when the user terminal is not able to communicate with the reliability management server;

receiving, from the user, input related to whether or not the command of the program is called; and  restarting the execution of the program from a step at which the program is temporarily stopped, when input of permission is received from the user.

\* \* \* \* \*